United States Patent
Yoshimura et al.

(10) Patent No.: US 11,408,318 B2
(45) Date of Patent: Aug. 9, 2022

(54) EXHAUST GAS PURIFICATION DEVICE (71) Applicant: MITSUBISHI HEAVY INDUSTRIES, LTD., Yokohama (JP)

(72) Inventors: Hiroyuki Yoshimura, Yokohama (JP); Katsumi Yano, Yokohama (JP); Katsuhiro Yashiro, Yokohama (JP); Akihiro Yamada, Yokohama (JP); Satoru Shishido, Yokohama (JP); Hironori Kishi, Yokohama (JP)

(73) Assignee: MITSUBISHI HEAVY INDUSTRIES, LTD., Yokohama (JP)

( * ) Notice: Subject to any disclaimer, the term of this patent is extended or adjusted under 35 U.S.C. 154(b) by 0 days.

(21) Appl. No.: 17/269,408

(22) PCT Filed: Aug. 30, 2019

(86) PCT No.: PCT/JP2019/034161
§ 371 (c)(1),
(2) Date: Feb. 18, 2021

(87) PCT Pub. No.: WO2020/045640
PCT Pub. Date: Mar. 5, 2020

(65) Prior Publication Data
US 2021/0254527 A1   Aug. 19, 2021

(30) Foreign Application Priority Data
Aug. 31, 2018 (JP) .............................. JP2018-162889

(51) Int. Cl.
*F01N 3/20* (2006.01)
*F01N 3/08* (2006.01)
(Continued)

(52) U.S. Cl.
CPC ........... *F01N 3/208* (2013.01); *F01N 3/0842* (2013.01); *F01N 3/105* (2013.01); *F01N 3/24* (2013.01); *F01N 2610/02* (2013.01)

(58) Field of Classification Search
CPC combination set(s) only.
See application file for complete search history.

(56) References Cited

U.S. PATENT DOCUMENTS 5,356,597 A * 10/1994 Wright ............... B01D 53/8609
  422/177
5,762,885 A * 6/1998 Debbage ................ B01D 53/88
  422/177

(Continued)

FOREIGN PATENT DOCUMENTS

JP     9-150039 A    6/1997
JP    11-128686 A    5/1999
(Continued)

OTHER PUBLICATIONS

International Search Report dated Jan. 28, 2020, issued in counterpart International Application No. PCT/JP2019/034161, with English Translation. (4 pages).

*Primary Examiner* — Binh Q Tran
(74) *Attorney, Agent, or Firm* — WHDA, LLP (57) ABSTRACT

An exhaust gas purification device is disclosed provided with a denitration catalyst for reducing and removing nitrogen oxides in exhaust gas using ammonia as a reducing agent in a gas flow passage through which the exhaust gas discharged from a boiler flows, and which injects ammonia into the exhaust gas flowing through the gas flow passage on an upstream side of the denitration catalyst, including multiple disturbing plate support members, and a disturbing plate. The multiple disturbing plate support members are fixedly provided on a downstream side of the denitration catalyst and arranged extending linearly in a flow path cross (Continued)

section to cross the gas flow passage. The disturbing plate includes an exhaust gas flow facing surface exposed on an upstream side and is fixed to the disturbing plate support members so that a position thereof in the flow path cross section can be changed.

5 Claims, 7 Drawing Sheets (51) Int. Cl.
*F01N 3/10* (2006.01)
*F01N 3/24* (2006.01)

(56) References Cited

U.S. PATENT DOCUMENTS

| | | | |
|---|---|---|---|
| 7,201,845 B1* | 4/2007 | Koch | B01D 53/8631 |
| | | | 210/231 |
| 8,691,719 B2* | 4/2014 | Gadgil | F23J 15/003 |
| | | | 44/620 |
| 2017/0136425 A1* | 5/2017 | Lim | B01F 25/422 |
| 2017/0252698 A1* | 9/2017 | Zhang | F01D 25/305 |
| 2018/0147529 A1 | 5/2018 | Yano et al. | |
| 2018/0238213 A1* | 8/2018 | Kulkarni | F01N 3/0226 |
| 2019/0178139 A1* | 6/2019 | Chenoweth | F01N 13/1855 |

FOREIGN PATENT DOCUMENTS

| | | |
|---|---|---|
| JP | 2005-118622 A | 5/2005 |
| JP | 2013-176733 A | 9/2013 |
| JP | 2016-203032 A | 12/2016 |
| JP | 2016-215139 A | 12/2016 |
| JP | 2017-113697 A | 6/2017 |
| JP | 2017-214884 A | 12/2017 |

* cited by examiner

EXHAUST GAS PURIFICATION DEVICE

TECHNICAL FIELD

The present invention relates to an exhaust gas purification device for purifying exhaust gas from a boiler.

BACKGROUND ART

In a thermal power plant that burns fuel with a boiler to generate electricity, the exhaust gas from the boiler is purified by a flue gas treatment system and then discharged into the atmosphere. The flue gas treatment system is provided with a denitration device for reducing and removing nitrogen oxides (NOx) in exhaust gas, an air preheater that heats combustion air by exchanging heat with exhaust gas, an electrostatic precipitator that collects and removes soot (combustion ash) in exhaust gas, and the like.

Patent Literature 1 and Patent Literature 2 describe a denitration device which is provided with an ammonia concentration measuring device for measuring the concentration of ammonia on the downstream side of a denitration catalyst using ammonia as a reducing agent, and controls the injection of ammonia to the upstream side of the denitration catalyst according to the concentration of ammonia on the downstream side of the denitration catalyst.

In addition, Patent Literature 3 and Patent Literature 4 describe a denitration device which is provided with an ammonia decomposition catalyst on the downstream side of a denitration catalyst using ammonia as a reducing agent, and injects an oxidant through an oxidant injection tube between the denitration catalyst and the ammonia decomposition catalyst.

CITATION LIST

Patent Literature

Patent Literature 1: Japanese Patent Application Publication No. 2013-176733
Patent Literature 2: Japanese Patent Application Publication No. 2017-113697
Patent Literature 3: Japanese Patent Application Publication No. Hei 11-128686
Patent Literature 4: Japanese Patent Application Publication No. Hei 9-150039

SUMMARY OF INVENTION

Technical Problem

In the case of a denitration device that uses a denitration catalyst using ammonia as a reducing agent, if the concentration of leaked ammonia flowing out of the denitration catalyst is high, acid ammonium sulfate (ammonium hydrogen sulfate: $NH_4HSO_4$) is generated to adhere to and deposit on equipment (for example, air preheater) on the downstream side of the denitration device, which may lead to deterioration or malfunction of the equipment (for example, blockage of the air preheater). Since the concentration of leaked ammonia is not uniform in a flow path cross section, even when the average concentration in the flow path cross section is low, the presence of a high concentration portion may cause the adhesion and deposition of acid ammonium sulfate on the equipment on the downstream side.

The adhesion and deposition of acid ammonium sulfate on the downstream side equipment due to such leaked ammonia can be suppressed by controlling the injection of ammonia to the upstream side of the denitration catalyst according to the concentration of ammonia on the downstream side of the denitration catalyst, as in Patent Literature 1 and Patent Literature 2, or by providing an ammonia decomposition catalyst on the downstream side of the denitration catalyst as in Patent Literature 3 and Patent Literature 4.

However, Patent Literature 1 and Patent Literature 2 provide an ammonia concentration measuring device on the downstream side of the denitration catalyst to control the injection of ammonia to the upstream side of the denitration catalyst according to the concentration of ammonia on the downstream side of the denitration catalyst, which therefore causes the complication of the denitration device and the complication of the control. In addition, Patent Literature 3 and Patent Literature 4 provide an ammonia decomposition catalyst on the downstream side of the denitration catalyst to inject an oxidant between the denitration catalyst and the ammonia decomposition catalyst through an oxidant injection tube, which causes the complication of the denitration device. Furthermore, since the ammonia decomposition catalyst is provided in addition to the denitration catalyst, the pressure loss increases and the load of the fan for passing the exhaust gas increases as compared with the case where only a denitration catalyst is provided.

Therefore, an object of the present invention is to provide an exhaust gas purification device capable of suppressing the adhesion and deposition of acid ammonium sulfate on downstream side equipment while suppressing the complication of the device, the complication of the control, and the increase in the load of a fan.

Solution to Problem

To achieve the above object, a first aspect of the present invention is an exhaust gas purification device which is provided with a denitration catalyst for reducing and removing nitrogen oxides in exhaust gas using ammonia as a reducing agent in a gas flow passage through which the exhaust gas discharged from a boiler flows, and which injects ammonia into the exhaust gas flowing through the gas flow passage on an upstream side of the denitration catalyst, including: multiple disturbing plate support members; and a disturbing plate.

The multiple disturbing plate support members are fixedly provided on a downstream side of the denitration catalyst, and arranged extending linearly in a flow path cross section so as to cross the gas flow passage. The disturbing plate includes an exhaust gas flow facing surface exposed on an upstream side, and is fixed to the disturbing plate support members so that a position thereof in the flow path cross section can be changed.

In the above configuration, the concentration of leaked ammonia (unreacted ammonia) on the downstream side of the denitration catalyst and on the upstream side from the position where the disturbing plate is supported by the disturbing plate support members (for example, near the outlet from the denitration catalyst) is measured at multiple points in the flow path cross section during boiler operation (which may be during test operation), and during the stop of operation, the disturbing plate is arranged so as to overlap the portion determined to have a high ammonia concentration by the measurement during operation and the flow direction of the exhaust gas, and fixed to the disturbing plate support members. When the boiler is operated in such a state, the exhaust gas at the location where the ammonia concentration is high hits the exhaust gas flow facing surface of the disturbing plate, and is disturbed and mixed (agitated) with the surrounding exhaust gas, which reduces the deviation of the ammonia concentration in the flow path cross section (difference from the average concentration). Therefore, it becomes difficult to generate acid ammonium sulfate, and it is possible to suppress the adhesion and deposition of acid ammonium sulfate on the downstream side equipment (for example, an air preheater).

If the concentration distribution of leaked ammonia in the flow path cross section fluctuates due to long-term use and the like, and it is determined that the location with high ammonia concentration has been displaced by measurement during operation, the fixing of the disturbing plate is released, and the disturbing plate is moved so as to overlap the location determined to have a high ammonia concentration in the flow direction of the exhaust gas and fixed again to the disturbing plate support members. As a result, even when the concentration distribution of leaked ammonia in the flow path cross section fluctuates, it is possible to suppress the adhesion and deposition of acid ammonium sulfate on the equipment on the downstream side.

Since the disturbing plate is partially arranged, not over the entire flow path cross section, the pressure loss is less likely to increase as compared with the case where the ammonia decomposition catalyst is provided over the entire flow path cross section, and the increase in the load of the fan through which the exhaust gas is circulated can be suppressed.

A second aspect of the present invention is the exhaust gas purification device according to the first aspect, wherein the disturbing plate includes supported portions on both sides that are releasably fixed to any two adjacent disturbing plate support members among the multiple disturbing plate support members, and the exhaust gas flow facing surface exposed to the upstream side between the supported portions on both sides.

In the above configuration, since the supported portions on both sides of the exhaust gas flow facing surface hit by the exhaust gas are fixed to the respective disturbing plate support members, the support state of the disturbing plate by the disturbing plate support member is stable.

A third aspect of the present invention is the exhaust gas purification device according to the first or second aspect, wherein the exhaust gas flow facing surface of the disturbing plate includes multiple inclined surfaces inclined from a ridge of the facing surface on the upstream side to the downstream side.

In the above configuration, since the exhaust gas flow facing surface includes multiple inclined surfaces inclined from the ridge of the facing surface on the upstream side to the downstream side, and the exhaust gas having hit the exhaust gas flow facing surface flows to the downstream side along each inclined surface, exhaust gas can be agitated smoothly and reliably.

A fourth aspect of the present invention is the exhaust gas purification device according to the first to third aspects, further including: an air ejection unit which is arranged so as to overlap the downstream side of the disturbing plate and ejects air.

In the above configuration, since the exhaust gas is agitated by the air ejected from the air ejection unit in addition to the agitation by the disturbing plate, the agitation ability of the exhaust gas can be enhanced.

A fifth aspect of the present invention is the exhaust gas purification device according to the first to fourth aspects, wherein an ammonia decomposition catalyst which decomposes unreacted ammonia is supported on the disturbing plate.

In the above configuration, since the leaked ammonia is decomposed by the ammonia decomposition catalyst supported on the disturbing plate, the concentration of the leaked ammonia can be reduced in the portion where the ammonia concentration is high.

Advantageous Effects of Invention

The present invention makes it possible to suppress the adhesion and deposition of acid ammonium sulfate on downstream side equipment while suppressing the complication of the device, the complication of the control, and the increase in the load of a fan.

DESCRIPTION OF EMBODIMENTS

An exhaust gas purification device according to a first embodiment of the present invention is described with reference to the drawings. In the figures, the arrow Df indicates the flow direction of the exhaust gas, and Da indicates the flow direction of the combustion air.

Figure 1:
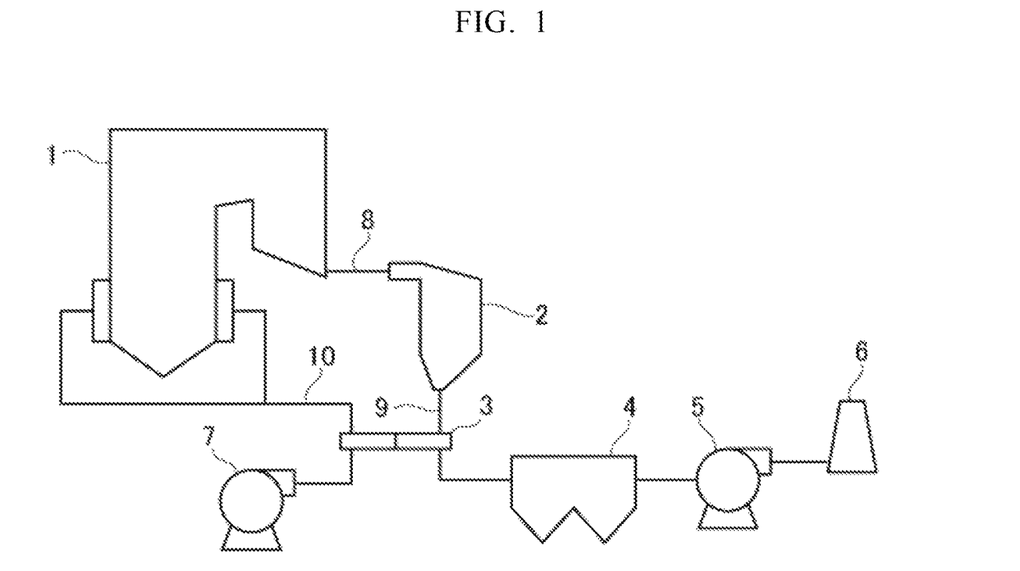
FIG. 1 is a schematic view of a flue gas treatment system including an exhaust gas purification device according to the first embodiment of the present invention.

As shown in FIG. 1, the flue gas treatment system for purifying the exhaust gas from the boiler (coal-fired boiler) 1 and discharging it into the atmosphere is provided with a denitration device 2, an air preheater (AH: air heater) 3, an electrostatic precipitator 4, and an induced draft fan 5. Note that the boiler 1 may be a boiler other than a coal-fired one.

The denitration device 2 is arranged on the downstream side of the boiler 1 and reduces and removes nitrogen oxides (NOx) in the exhaust gas. The air preheater 3 is arranged on the downstream side of the denitration device 2 and heats the combustion air by heat exchange with the exhaust gas. The electrostatic precipitator 4 is arranged downstream of the air preheater 3 and collects and removes soot (combustion ash) in the exhaust gas. The induced draft fan 5 is arranged downstream of the electrostatic precipitator 4 and inducts exhaust gas to guide it to the chimney 6.

The boiler 1 and the denitration device 2, and the denitration device 2 and the air preheater 3 communicate with each other via the exhaust gas ducts 8 and 9, respectively, and a flow path cross section of the gas flow passage from the inside of the boiler 1 to the air preheater 3 (the cross section substantially orthogonal to the flow direction Df of the exhaust gas) is formed in a substantially rectangular shape.

The combustion air is introduced into the air preheater 3 by the forced draft fan 7, preheated by the heat of the exhaust gas, and supplied to the boiler 1 through the air duct 10.

Figure 2:
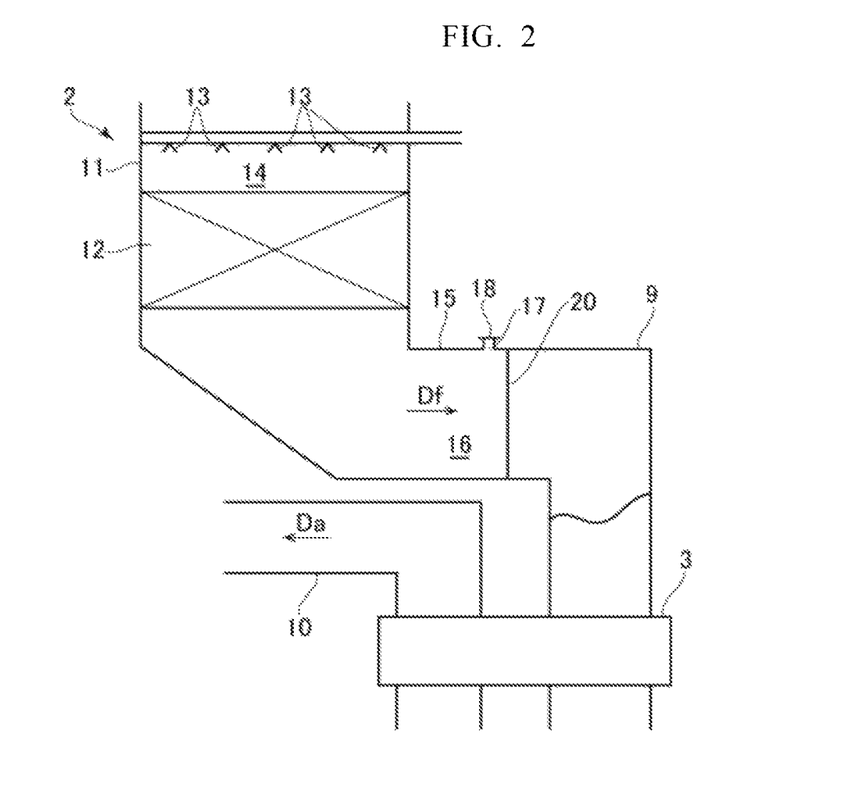
FIG. 2 is a cross-sectional view showing a schematic configuration of the exhaust gas purification device of FIG. 1.

As shown in FIG. 2, the denitration device 2 includes a denitration reactor 11, a catalyst layer 12, and multiple reducing agent injection nozzles (reducing agent injection unit) 13. Inside the denitration reactor 11, a gas flow passage 14 having a rectangular cross section is defined. The catalyst layer 12 and the reducing agent injection nozzles 13 are arranged in the gas flow passage 14 and fixed to the denitration reactor 11.

The catalyst layer 12 includes a denitration catalyst (ammonia denitration catalyst) for reducing and removing nitrogen oxides in exhaust gas using ammonia as a reducing agent, and a carrier that supports the denitration catalyst. The catalyst layer 12 may include one layer (one stage) or multiple layers (multiple stages).

The reducing agent injection nozzles 13 are arranged in the gas flow passage 14 on the upstream side of the catalyst layer 12, and inject ammonia into the exhaust gas flowing through the gas flow passage 14. Note that the reducing agent injection nozzles 13 may be arranged in the gas flow passage in the exhaust gas duct 8 (see FIG. 1) connecting the boiler 1 and the denitration device 2.

The exhaust gas duct 9 that connects the denitration device 2 and the air preheater 3 includes a horizontal duct 15 that is connected to the denitration reactor 11 and extends substantially horizontally, and inside the horizontal duct 15, a gas flow passage 16 having a rectangular flow path cross section is defined.

Figure 3:
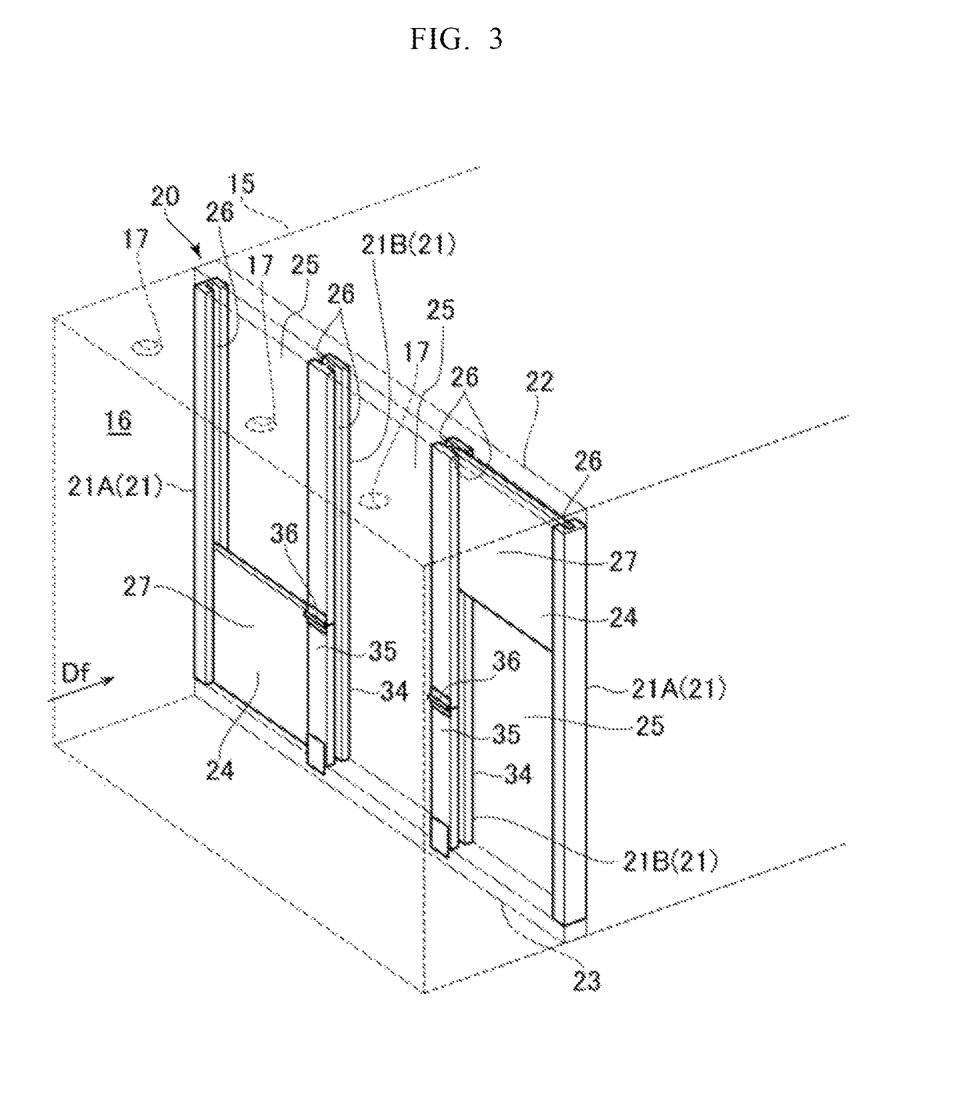
FIG. 3 is a perspective view of the exhaust gas disturbing mechanism of FIG. 2 as viewed from the upstream side.

As shown in FIG. 2 and FIG. 3, provided at predetermined positions of the horizontal duct 15 are multiple measurement holes (test seats) 17 arranged at equal intervals along the flow path cross section, and the measurement holes 17 are held in a closed state by lids 18. When measuring the concentration of leaked ammonia (unreacted ammonia), each of the lids 18 is removed, and a concentration sensor (not shown) is inserted through the measurement hole 17 into the gas flow passage 16.

Figure 4:
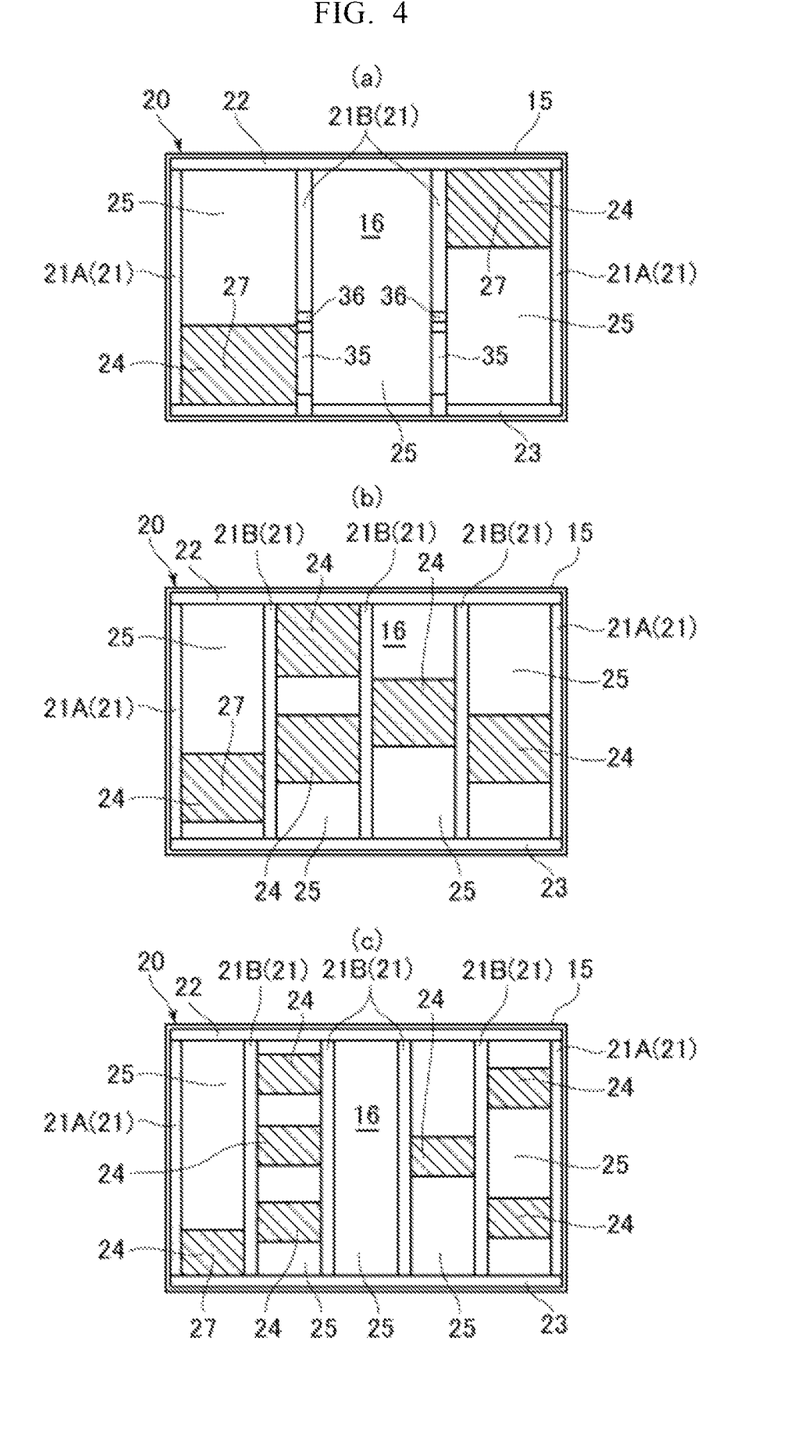
FIG. 4 is a front view of the exhaust gas disturbing mechanism as viewed from the upstream side, in which (a) is a front view of the example of FIG. 3 where the slide areas are arranged in three rows horizontally, (b) is a front view of a modified example where slide areas are arranged in four rows horizontally, and (c) is a front view of another modified example where slide areas are arranged in five rows horizontally.

The gas flow passage 16 on the downstream side of the measurement holes 17 is provided with an exhaust gas disturbing mechanism 20. As shown in FIG. 3 and FIG. 4, the exhaust gas disturbing mechanism 20 includes multiple disturbing plate support members 21, an upper fixing member 22, a lower fixing member 23, and one or more (two in the example of FIG. 3 and FIG. 4(a)) disturbing plates 24. The disturbing plate support members 21 include disturbing plate support members 21A at both ends and multiple (two in the examples of FIG. 3 and FIG. 4(a)) intermediate disturbing plate support members 21B.

The disturbing plate support members 21A at both ends are each a long member having a U-shaped cross section with a slide groove 26 on one side, and extend linearly in a substantially vertical direction along the left and right side edges of the flow path cross section. The intermediate disturbing plate support members 21B are each a long member having an H-shaped cross section with slide grooves 26 on both sides, arranged at equal intervals between the disturbing plate support members 21A at both ends, and extend linearly in a substantially vertical direction. The upper fixing member 22 is a long member extending substantially horizontally along the upper edge of the flow path cross section, and the lower fixing member 23 is a long member extending substantially horizontally along the lower edge of the flow path cross section. The upper fixing member 22 is fixed to the inner surface (lower surface) of the upper wall (ceiling) of the horizontal duct 15, and the lower fixing member 23 is fixed to the inner surface (upper surface) of the lower wall (bottom wall) of the horizontal duct 15. The upper end and lower end of the disturbing plate support members 21 are fixed to the upper fixing member 22 and the lower fixing member 23, respectively, with the slide grooves 26 of two adjacent disturbing plate support members 21 facing each other, and the disturbing plate support members 21A at both ends are fixed to the inner surfaces of the side walls of the horizontal duct 15. Specifically, the disturbing plate support members 21A at both ends, the upper fixing member 22, and the lower fixing member 23 form a rectangular frame along the outer edge of the flow path cross section, and multiple disturbing plate support members 21 are arranged in a grid pattern substantially in parallel at equal intervals. The two adjacent disturbing plate support members 21 define a rectangular slide area 25 in which the disturbing plate 24 is slidably supported along the vertical direction.

In the present embodiment, as shown in FIG. 3 and FIG. 4(a), two intermediate disturbing plate support members 21B are installed. The disturbing plate support members 21A at both ends and the two intermediate disturbing plate support members 21B (a total of four disturbing plate support members 21) define slide areas 25 in three horizontal rows (left, center, right) arranged in the horizontal direction, and one disturbing plate 24 is arranged in each of the left and right slide areas 25 except the center one.

Any number of intermediate disturbing plate support members 21B can be installed according to the size of the gas flow passage 16 and the like. FIG. 4(a) shows an example where two disturbing plate support members 21B are installed in the middle, and as shown in FIG. 4(b) and FIG. 4(c), three or more disturbing plate support members 21B can be installed in the middle. FIG. 4(b) is an example where three disturbing plate support members 21B are installed in the middle to provide four horizontal rows of slide areas 25, and FIG. 4(c) shows an example where four disturbing plate support members 21B are installed in the middle to provide five horizontal rows of slide areas 25. In addition, as shown in FIG. 4(b) and FIG. 4(c), multiple disturbing plates 24 can be installed in the same section (one slide area 25) partitioned by the disturbing plate support members 21 according to the leaked ammonia distribution state of the gas flow passage 16. FIG. 4(b) shows an example where two disturbing plates 24 are installed in the slide area 25 in the second row from the left, and FIG. 4(c) shows an example where three disturbing plates 24 are installed in the slide area 25 in the second row from the left, and two disturbing plates 24 are installed in the slide area 25 at the right end. In addition, there may be a section (slide area 25) where no disturbing plate 24 is installed. FIG. 4(a) and FIG. 4(c) are examples where no disturbing plate 24 is installed in the central slide area 25.

Figure 5:
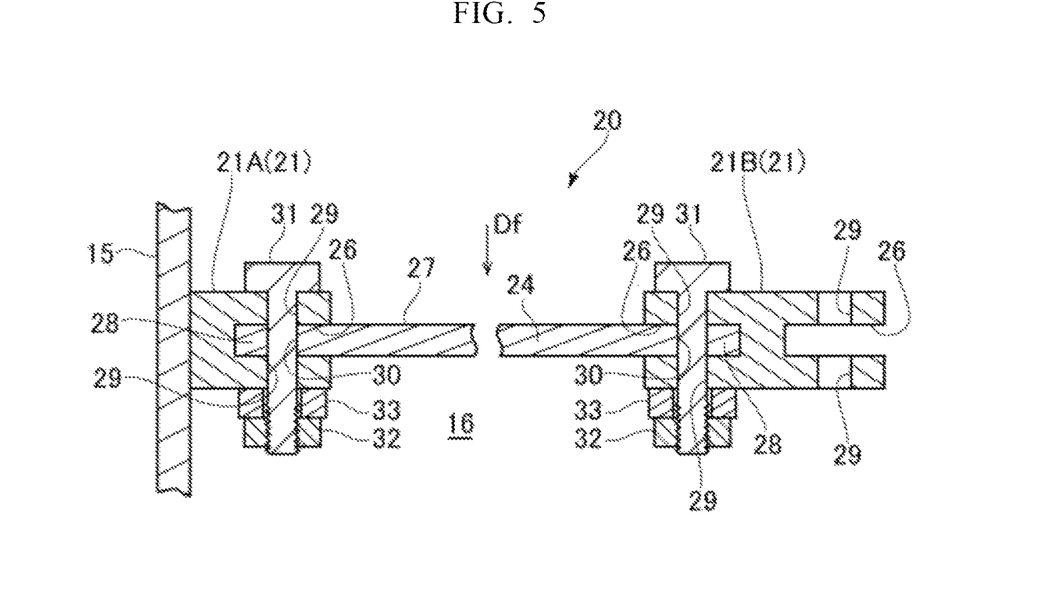
FIG. 5 is a cross-sectional view showing a fixed portion between disturbing plate support members and a disturbing plate.
Figure 6:
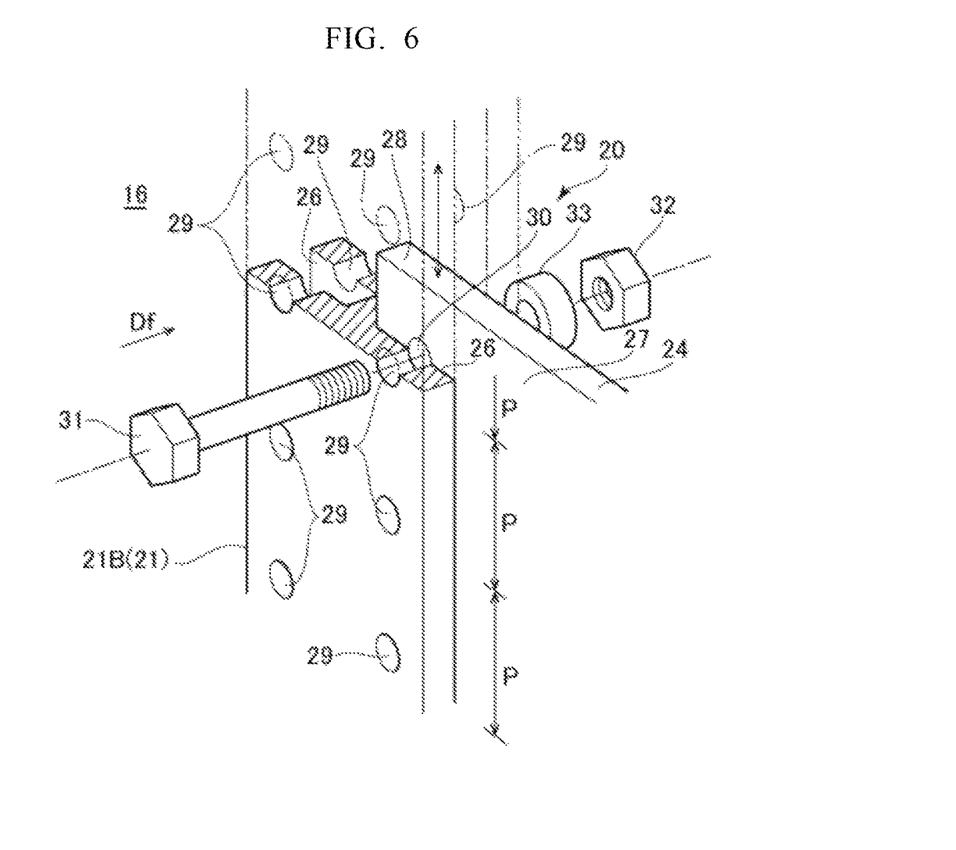
FIG. 6 is a perspective view showing a disturbing plate support member and a disturbing plate.

As shown in FIG. 5 and FIG. 6, the disturbing plate 24 has the shape of a rectangular flat plate having the supported portions 28 integrally on both sides of the exhaust gas flow facing surface 27, and the supported portions 28 on both sides are inserted into and engaged with the respective slide grooves 26 of two adjacent disturbing plate support members 21. When the supported portions 28 on both sides are engaged with the respective slide grooves 26, the disturbing plate 24 can slide and move along the disturbing plate support members 21 in the slide area 25, with the exhaust gas flow facing surface 27 exposed to the upstream side.

The disturbing plate support member 21 is formed with multiple bolt insertion holes 29 that penetrate the slide grooves 26. The multiple bolt insertion holes 29 are arranged linearly over substantially the entire length of the disturbing plate support members 21 at a predetermined pitch P (for example, 300 mm) along the extending direction of the disturbing plate support members 21 (substantially in the vertical direction in the present embodiment). The supported portion 28 of the disturbing plate 24 is formed with multiple (for example, two upper and lower) bolt insertion holes 30 which are separated by an integral multiple of the predetermined pitch P. The bolt insertion hole 30 of the supported portion 28 is overlapped with an arbitrary bolt insertion hole 29 of the disturbing plate support member 21, a bolt 31 is inserted into the bolt insertion holes 29 and 30, and a nut 32 is screwed and tightened, and thereby the disturbing plate 24 is fixed to the disturbing plate support member 21. When the fastening by the bolt 31 is released, the bolt 31 is pulled out of the bolt insertion holes 29 and 30, and the bolt insertion hole 29 for insertion of the bolt 31 is changed, the fixation positions of the disturbing plate 24 (upper and lower positions in the present embodiment) can be changed at a predetermined pitch P. In this way, the supported portions 28 on both sides of the disturbing plate 24 are releasably fixed to any two adjacent disturbing plate support members 21 among the multiple disturbing plate support members 21.

A spacer 33 is interposed between the disturbing plate support member 21 and the nut 32. When the spacer 33 is interposed, the disturbing plate support member 21 and the disturbing plate 24 can be fastened so as not to overlap with the threaded portion of the bolt 31 (so as to overlap only with the large-diameter non-threaded portion with no male screw formed), making it possible to firmly fix the disturbing plate 24.

Figure 7:
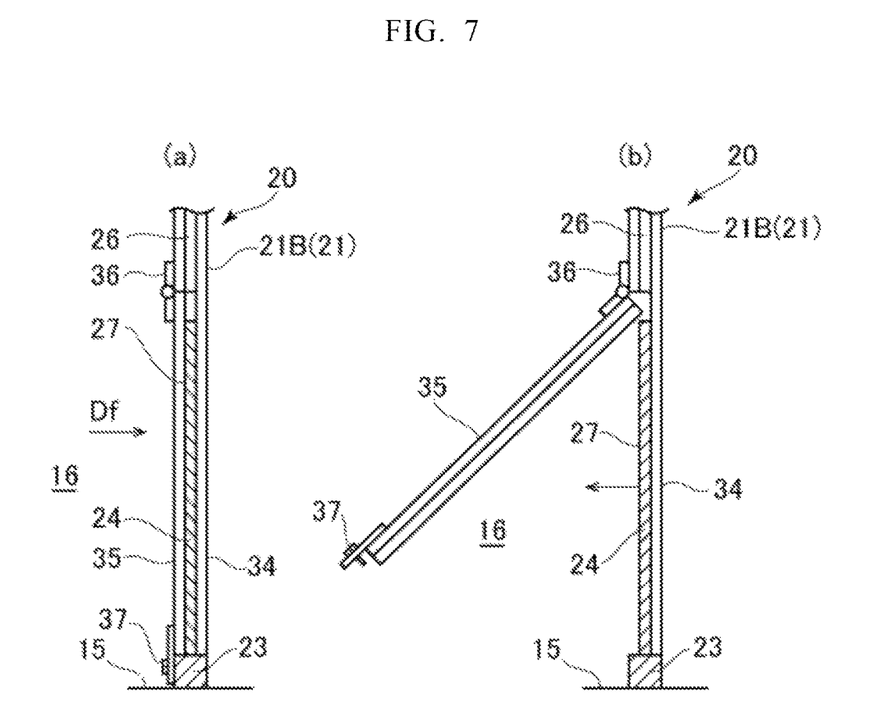
FIG. 7 is a cross-sectional view for explaining attachment and detachment of the disturbing plate to/from the disturbing plate support members, in which (a) shows a state where the slide groove is closed, and (b) shows a state where the slide groove is open.

As shown in FIG. 7, since the intermediate disturbing plate support member 21B allows the disturbing plate 24 to be attached and detached while being fixed to the horizontal duct 15, a part or the whole of the slide groove 26 is openable to the upstream side or the downstream side. In the present embodiment, the lower portion of the disturbing plate support member 21B is divided into a downstream fixed side member 34 fixed to the lower fixing member 23 and an upstream side movable side member 35 separable from the fixed side member 34. The upper end of the movable side member 35 is rotatably connected to the disturbing plate support member 21 via a hinge 36 below, and the lower end of the movable side member 35 is fastened and fixed to the lower fixing member 23 with a bolt 37 (see FIG. 7(a)). In the case of adding or reducing (increasing or decreasing) the disturbing plate 24 or moving it horizontally to a different slide area 25 (changing the disturbing plate support member 21 to be fixed) or the like, the bolt 37 is released, and the movable side member 35 is opened and moved about the hinge 36 to the upstream side (see FIG. 7(b)). As a result, the upstream side of the slide grooves 26 is opened, and attachment and detachment of the disturbing plate 24 (attachment and detachment of the disturbing plate 24 to/from the slide area 25) is possible. In addition, in FIG. 4(b) and FIG. 4(c), the illustration of the movable side member 35 and the hinge 36 is omitted.

As described above, the multiple disturbing plate support members 21 are fixedly provided on a downstream side of the denitration catalyst (catalyst layer 12), and arranged extending linearly in the flow path cross section so as to cross the gas flow passage 16. The disturbing plate 24 includes an exhaust gas flow facing surface 27 exposed on an upstream side, and is fixed to the disturbing plate support members 21 so that a position thereof in the flow path cross section can be changed.

The number and fixation positions of the disturbing plates 24 installed in the exhaust gas disturbing mechanism 20 are set so as to overlap the location where the ammonia concentration has been determined to be high in the flow path cross section in the flow direction Df of the exhaust gas.

Specifically, during the operation (or test operation) of the boiler 1, the concentration of leaked ammonia (unreacted ammonia) on the downstream side of the denitration catalyst (catalyst layer 12) and on the upstream side of the exhaust gas disturbing mechanism 20 is measured at multiple points in the flow path cross section with a concentration sensor inserted through the measurement hole 17. Then, during the stoppage of operation of the boiler 1, the disturbing plate 24 is arranged so as to overlap the location (one or more locations) where the ammonia concentration is determined to be high (higher than other measurement locations) by the measurement during operation in the flow direction Df of the exhaust gas, and fixed to the disturbing plate support members 21.

Figure 8:
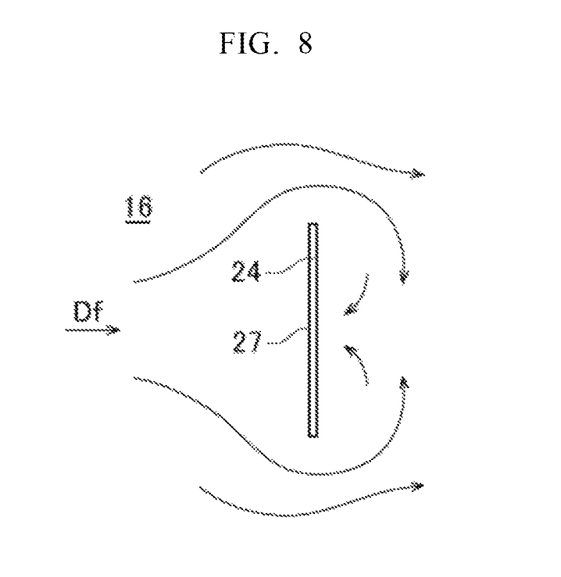
FIG. 8 is a diagram schematically showing the flow of exhaust gas around a disturbing plate.

When the boiler 1 is operated in such a state, as shown in FIG. 8, the exhaust gas at the location where the ammonia concentration is high hits the exhaust gas flow facing surface 27 of the disturbing plate 24, and is disturbed and mixed (agitated) with the surrounding exhaust gas, which reduces the deviation of the ammonia concentration in the flow path cross section (difference from the average concentration (variation in concentration)). Therefore, it becomes difficult to generate acid ammonium sulfate, and it is possible to suppress the adhesion and deposition of acid ammonium sulfate on the downstream side equipment (for example, an air preheater 3).

In addition, if the concentration distribution of leaked ammonia in the flow path cross section fluctuates due to long-term use and the like, and it is determined that the location with high ammonia concentration has been displaced by measurement during operation, the fixing of the disturbing plate 24 is released, and the disturbing plate 24 is moved so as to overlap the location determined to have a high ammonia concentration in the flow direction Df and fixed again to the disturbing plate support members 21. As a result, even when the concentration distribution of leaked ammonia in the flow path cross section fluctuates, it is possible to suppress the adhesion and deposition of acid ammonium sulfate on the equipment on the downstream side. Note that in this case, the number of disturbing plates 24 installed may be increased or decreased, or the disturbing plates 24 may be moved horizontally to different slide areas 25.

In addition, since the disturbing plate 24 is partially arranged, not over the entire flow path cross section, the pressure loss is less likely to increase as compared with the case where the ammonia decomposition catalyst is provided over the entire flow path cross section, and the increase in the load of the fan through which the exhaust gas is circulated can be suppressed.

Furthermore, since the supported portions 28 on both sides of the exhaust gas flow facing surface 27 hit by the exhaust gas are fixed to the respective disturbing plate support members 21, the support state of the disturbing plate 24 by the disturbing plate support member 21 is stable.

Next, a second embodiment of the present invention is described with reference to FIG. 9. In the present embodiment, the shape of the disturbing plate is different from that in the first embodiment, and the other configurations are the same as those in the first embodiment, and therefore the description of the other configurations is omitted.

Figure 9:
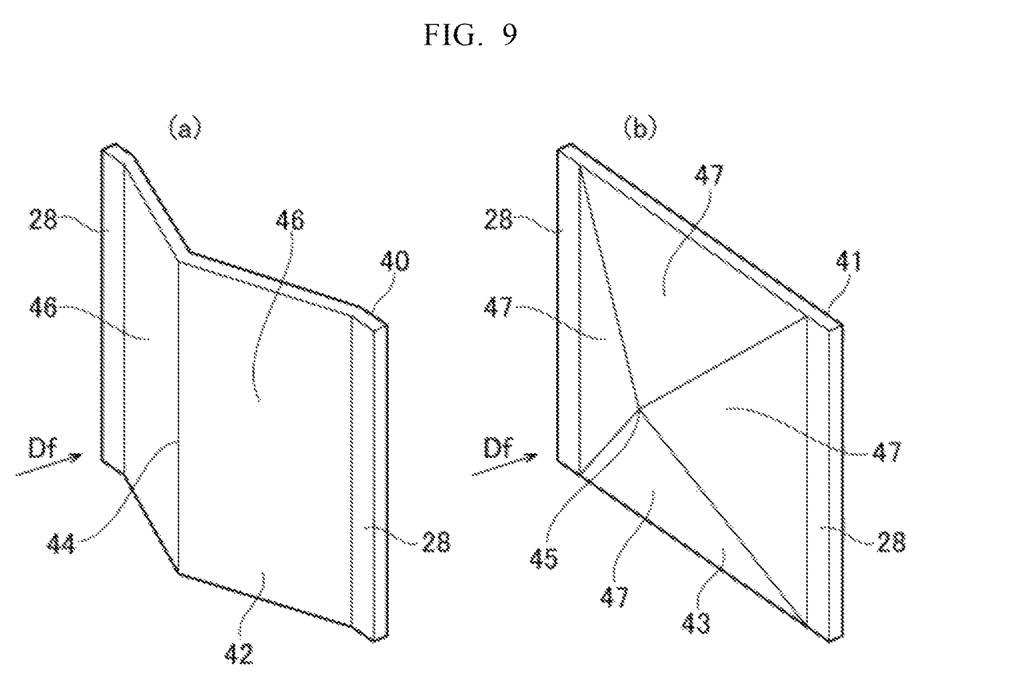
FIG. 9 is a perspective view of a disturbing plate according to a second embodiment, in which (a) shows a disturbing plate bent in an L shape, and (b) shows a disturbing plate formed in a prismatic shape.

As shown in FIG. 9, the exhaust gas flow facing surfaces 42 and 43 of the disturbing plates 40 and 41 of the present embodiment are provided with multiple inclined surfaces 46 and 47 that are inclined from ridges 44 and 45 of the facing surface on the upstream side to the downstream side. FIG. 9(a) is an example of the disturbing plate 40 bent in an L-shape, and the exhaust gas flow facing surface 42 is provided with two inclined surfaces 46 inclined from the facing surface ridge (ridge line portion) 44. FIG. 9(b) is an example of the disturbing plate 41 formed in a prismatic shape, and the exhaust gas flow facing surface 43 is provided with four inclined surfaces 47 inclined from the facing surface ridge 45.

As described above, since the exhaust gas flow facing surfaces 42 and 43 have multiple inclined surfaces 46 and 47 that are inclined from ridges 44 and 45 of the facing surface on the upstream side to the downstream side, the exhaust gas having hit the exhaust gas flow facing surfaces 42 and 43 flows downstream along the inclined surfaces 46 and 47. Therefore, the exhaust gas can be agitated smoothly and reliably.

Figure 10:
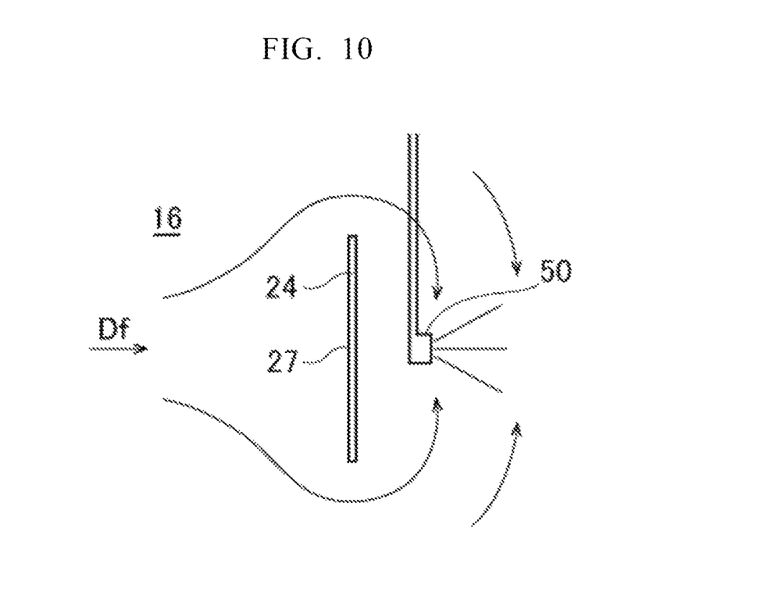
FIG. 10 is a diagram schematically showing the flow of exhaust gas according to a third embodiment.

Next, a third embodiment of the present invention is described with reference to FIG. 10. Since the present embodiment is provided with an air ejection nozzle (air ejection unit) 50 and the other configurations are the same as those of the first embodiment, the description of the other configurations is omitted.

The air ejection nozzle 50 is arranged so as to overlap the downstream side of the disturbing plate 24, and ejects air toward the downstream side. Since the exhaust gas is agitated by the air ejected from the air ejection nozzle 50 in addition to the agitation by the disturbing plate 24, the agitation ability of the exhaust gas can be enhanced.

Next, a fourth embodiment of the present invention is described. In the present embodiment, an ammonia decomposition catalyst which decomposes unreacted ammonia is supported on the disturbing plates 24, 40, and 41 of the first to third embodiments, and since the other configurations are the same as those of the first to third embodiments, the description of the other configurations is omitted.

The ammonia decomposition catalyst is supported on the disturbing plates 24, 40, and 41 by being fixed in the shape of a thin film on the surfaces of the exhaust gas flow facing surfaces 27, 42, and 43, for example, and the ammonia decomposition catalyst decomposes the leaked ammonia in the exhaust gas. Therefore, the concentration of leaked ammonia can be reduced at a location where the ammonia concentration is high.

Note that the present invention is not limited to the above-described embodiments and modifications described as examples, and can be variously modified according to the design and the like as long as it does not deviate from the technical idea of the present invention, even when it is not the above-described embodiments.

Figure 11:
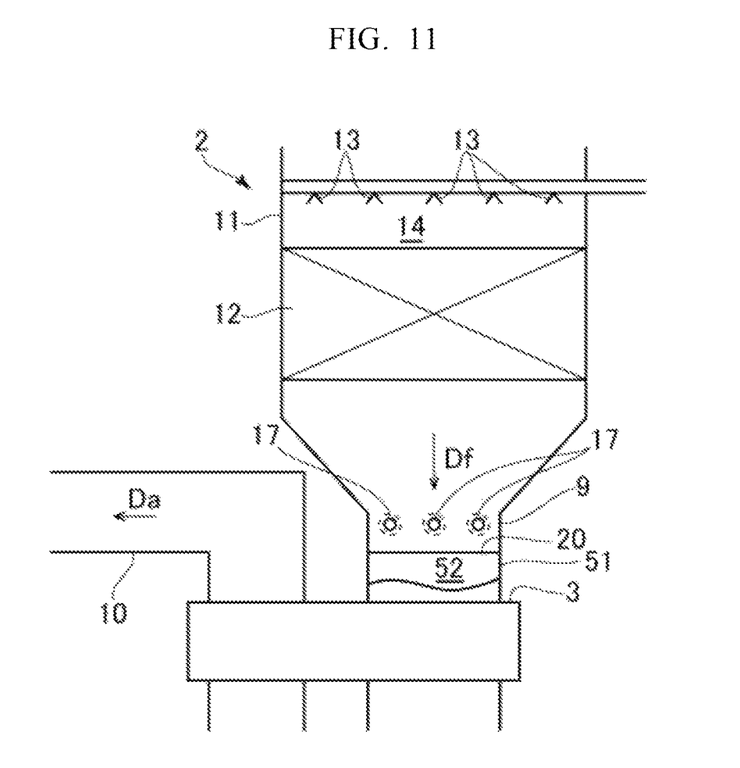
FIG. 11 is a cross-sectional view of a modified example of the exhaust gas purification device.

For example, in the above embodiments, the exhaust gas disturbing mechanism 20 (disturbing plates 24, 40, and 41) is provided in the gas flow passage 16 in the horizontal duct 15 of the exhaust gas duct 9 that communicates the denitration device 2 and the air preheater 3, but instead of this, as shown in FIG. 11, the exhaust gas disturbing mechanism 20 may be provided in the gas flow passage (flow passage in which the flow direction Df of the exhaust gas is vertically downward) 52 in the vertical duct 51 of the exhaust gas duct 9. In this case, the multiple disturbing plate support members extend linearly in the substantially horizontal direction, and the disturbing plate is substantially orthogonal to the vertical direction.

In addition, in the present embodiments, the disturbing plate support members 21 are arranged so that the disturbing plate 24 moves in the up-down direction (vertical direction), but the disturbing plate support members 21 may be arranged so that the disturbing plate 24 moves in a different direction (for example, the horizontal direction).

Further, the disturbing plate 24 may be fixed to the disturbing plate support members 21 by a method other than fastening with bolts 31 (for example, welding).

Further, the shape of the disturbing plate support members 21 is not limited to the U-shaped cross section and the H-shaped cross section, and may have other shapes.

REFERENCE SIGNS LIST 1 boiler
2 denitration device
3 air preheater
4 electrostatic precipitator
5 induced draft fan
6 chimney
7 forced draft fan
8, 9 exhaust gas duct
10 air duct
11 denitration reactor
12 catalyst layer
13 reducing agent injection nozzle (reducing agent injection unit)
14, 16, 52 gas flow passage
15 horizontal duct
17 measurement hole
18 lid
20 exhaust gas disturbing mechanism
21, 21A, 21B disturbing plate support member
22 upper fixing member
23 lower fixing member
24, 40, 41 disturbing plate
25 slide area
26 slide groove
27, 42, 43 exhaust gas flow facing surface
28 supported portion
29, 30 bolt insertion hole
31, 37 bolt
32 nut
33 spacer
34 fixed side member
35 movable side member
36 hinge 44, 45 facing surface ridge
46, 47 inclined surface
50 air ejection nozzle (air ejection unit)
51 vertical duct

The invention claimed is:

1. An exhaust gas purification device which is provided with a denitration catalyst for reducing and removing nitrogen oxides in exhaust gas using ammonia as a reducing agent in a gas flow passage through which the exhaust gas discharged from a boiler flows, and which injects ammonia into the exhaust gas flowing through the gas flow passage on an upstream side of the denitration catalyst, comprising:
   a plurality of disturbing plate support members which are fixedly provided on a downstream side of the denitration catalyst, and arranged extending linearly in a flow path cross section so as to cross the gas flow passage; and
   a disturbing plate which includes an exhaust gas flow facing surface exposed on an upstream side, and is fixed to the disturbing plate support members so that a position thereof in the flow path cross section can be changed.

2. The exhaust gas purification device according to claim 1, wherein
   the disturbing plate includes supported portions on both sides that are releasably fixed to any two adjacent disturbing plate support members among the plurality of disturbing plate support members, and the exhaust gas flow facing surface exposed to the upstream side between the supported portions on both sides.

3. The exhaust gas processing purification device according to claim 1, wherein
   the exhaust gas flow facing surface of the disturbing plate includes a plurality of inclined surfaces inclined from a ridge of the facing surface on the upstream side to the downstream side.

4. The exhaust gas purification device according to claim 1, further comprising:
   an air ejection unit which is arranged so as to overlap the downstream side of the disturbing plate and ejects air.

5. The exhaust gas purification device according to claim 1, wherein
   an ammonia decomposition catalyst which decomposes unreacted ammonia is supported on the disturbing plate.

* * * * *